(12) United States Patent
Baum et al.

(10) Patent No.: US 7,218,666 B2
(45) Date of Patent: May 15, 2007

(54) METHOD AND SYSTEM FOR TRANSMISSION AND FREQUENCY DOMAIN EQUALIZATION FOR WIDEBAND CDMA SYSTEM

(75) Inventors: Kevin Baum, Rolling Meadows, IL (US); Frederick W Vook, Schaumburg, IL (US); Timothy A Thomas, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1042 days.

(21) Appl. No.: 09/903,175

(22) Filed: Jul. 11, 2001

(65) Prior Publication Data
US 2002/0126741 A1 Sep. 12, 2002

Related U.S. Application Data

(60) Provisional application No. 60/259,043, filed on Dec. 29, 2000.

(51) Int. Cl.
*H04B 1/707* (2006.01)
*H03H 7/30* (2006.01)

(52) U.S. Cl. ...................... 375/148; 375/229
(58) Field of Classification Search ................ 375/130, 375/140–153, 229, 260, 267, 295, 299, 316, 375/346, 347, 348, 349, 350; 370/320, 335, 370/342, 441; 455/59
See application file for complete search history.

(56) References Cited

U.S. PATENT DOCUMENTS 5,692,006 A 11/1997 Ross ........................... 375/200
5,719,899 A * 2/1998 Thielecke et al. ........... 375/144
5,960,032 A * 9/1999 Letaief et al. ............... 375/146
6,202,178 B1 * 3/2001 Spruyt ......................... 714/702
6,279,022 B1 * 8/2001 Miao et al. .................. 708/404
6,373,861 B1 * 4/2002 Lee ............................. 370/503
6,449,246 B1 * 9/2002 Barton et al. ................ 370/210
6,654,431 B1 * 11/2003 Barton et al. ................ 375/346
6,826,240 B1 * 11/2004 Thomas et al. ............. 375/340
6,829,296 B1 * 12/2004 Troulis et al. ............... 375/232
7,031,371 B1 * 4/2006 Lakkis ........................ 375/146
7,082,174 B1 * 7/2006 Smee et al. ................. 375/349

OTHER PUBLICATIONS

Chen, Kwang-Cheng and Wu, Shan-Tsung, "A Programmable Architecture for OFDM-CDMA", IEEE Communications Magazine, vol. 37, Issue 11, Nov. 1999, pp. 76-82.*
Prasad, R. and Hara, S., "An Overview of Multicarrier CDMA," Spread Spectrum Techniques and Applications Proceeding, 1996, IEEE 4th Symposium on, vol. 1, Sep. 22-25, 1996, pp. 107-114.*

(Continued)

*Primary Examiner*—Kevin Kim

(57) ABSTRACT

The invention provides a method and system for transmission and frequency domain equalization for wideband CDMA communications by providing at least one spread sequence portion, and inserting a cyclic redundancy to the spread sequence to form a transmitted baseband sequence. The invention further provides a method and system for converting a plurality of receive samples from at least one spread sequence portion into a plurality of frequency domain samples, determining a plurality of frequency domain equalization weights for the frequency domain samples, and determining a time domain signal estimate based on the frequency domain equalization weights and frequency domain samples.

60 Claims, 7 Drawing Sheets

OTHER PUBLICATIONS

Xing, H. and Renfors, M., "The Performance Evaluation of Multi-Carrier CDMA System with Frequency Domain Equalization," Vehicular Technology Conference, 1999, IEEE VTS 50th, vol. 4, Sep. 19-22, 1999, pp. 2362-2366.*

C.D. Frank and E. Visotsky; "Adaptive Interference Suppression for Direct-Sequence CDMA Systems with Long Spreading Codes", Proc. 36$^{th}$ Annual Allerton Conference on Communication, Control and Computing, Monticello, II, Sep. 1998.

M.V. Clark, "Adaptive Frequency-Domain Equalization and Diversity Combining for Broadband Wireless Communications", IEEE Journal on Selected Areas in Communications, vol. 16, No. 8, Oct. 1998, pp. 1385-1395.

* cited by examiner

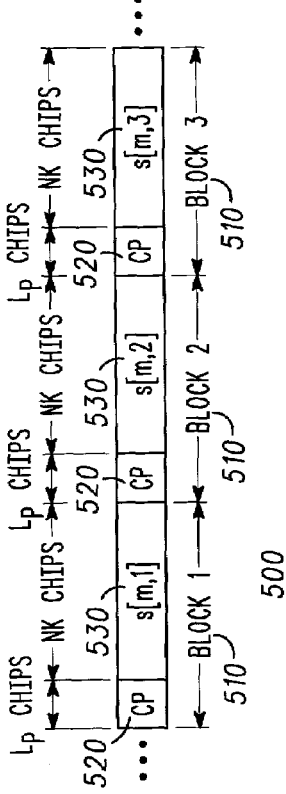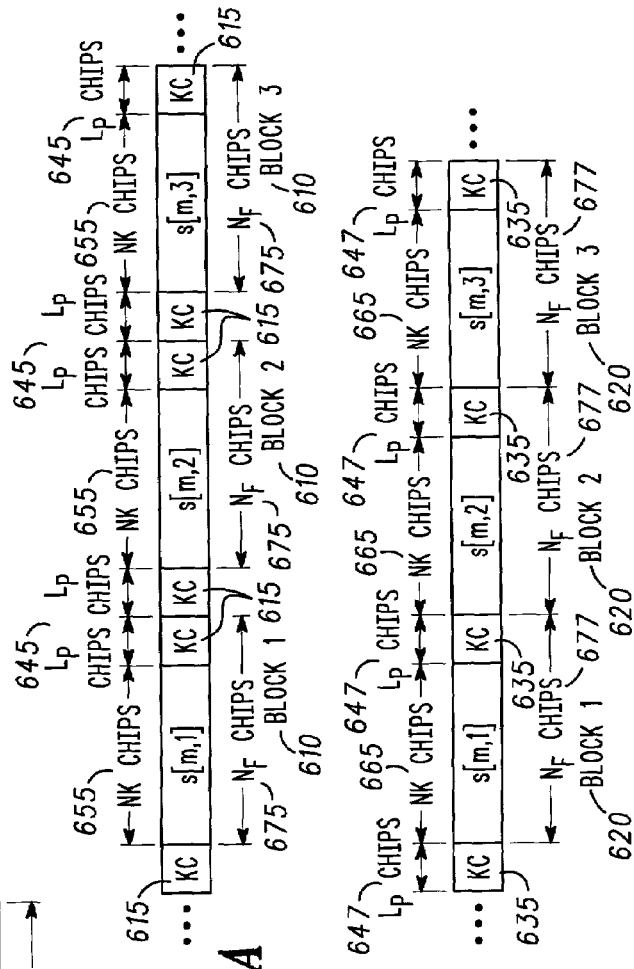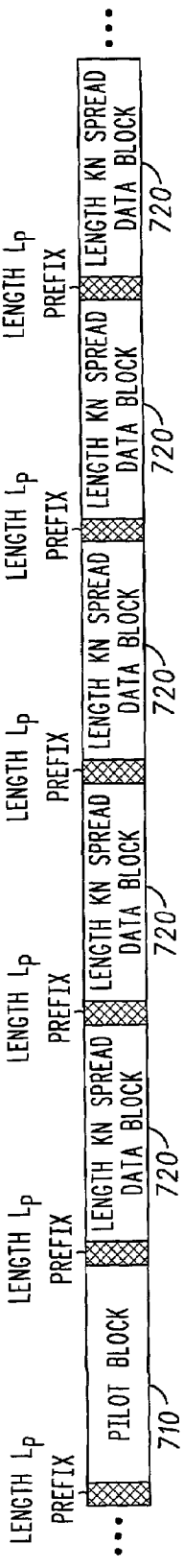
FIG. 5
FIG. 6A
FIG. 6B
FIG. 7

METHOD AND SYSTEM FOR TRANSMISSION AND FREQUENCY DOMAIN EQUALIZATION FOR WIDEBAND CDMA SYSTEM

RELATED APPLICATION

This application claims the benefit of U.S. Provisional Application Ser. No. 60/259,043, filed Dec. 29, 2000.

FIELD OF THE INVENTION

The present invention generally relates to the field of communication systems. More specifically, the invention relates to a transmission format and related equalization methods for CDMA and direct-sequence spread spectrum communication systems.

BACKGROUND OF THE INVENTION

Code-Division Multiple Access (CDMA) is a well-known spread-spectrum physical layer technology for cellular systems. CDMA is currently used in the US IS-95 cellular standard and forms the foundation for some so-called $3^{rd}$ generation cellular systems, such as IS-2000. Third generation (3G) systems are designed to support higher data rates and a wide range of new services. However, the demand for even higher data rates is expected to lead to the development of $4^{th}$ generation systems in the years following the deployment of 3G.

There are several known techniques for increasing the peak per-user data rate in a CDMA system. First, the concept of multi-code CDMA involves simultaneously allocating multiple Walsh-code channels to a single user, thereby multiplying the peak data rate that can be delivered to any one user at a time. Second, increasing the chip rate, and therefore the system bandwidth, will directly increase the peak per-user data rate. Third, the use of higher-order modulation on each of the Walsh-code channels provides another method for increasing the data-carrying capacity.

Current cellular CDMA systems operate in relatively low bandwidths (1.25 MHz), and use low-order modulation with aggressive error control coding. On the forward link of these systems, the performance with a RAKE receiver is generally viewed as adequate for typical land-mobile cellular channels. However, if the previously mentioned techniques are used to significantly increase the data rate, the RAKE receiver can be shown to provide sub-optimal performance in severe multipath channels. Much of the reason for this sub-optimal performance can be traced to the fact that a multipath delay spread channel destroys the orthogonality of the Walsh-code channels. Walsh codes are orthogonal to each other, but have nonzero autocorrelation and nonzero cross-correlation properties. This loss of Walsh code orthogonality causes the output of a particular RAKE finger to contain significant energy (i.e., interference) from the multipath components having different arrival times. This interference, from other multipath components, is called intracellular interference. Intracellular interference becomes more severe as the channel multipath delay spread increases. As the system bandwidth is increased, the chip-span of a given multipath delay spread channel increases proportionally, which increases the required number of RAKE fingers in the RAKE receiver. As the number of multipath components resolved in the receiver increases, intracellular interference increases, which can further degrade RAKE performance.

As an alternative to a RAKE receiver, time-domain adaptive equalization is a technique for suppressing forward link intracellular interference caused by loss of Walsh code orthogonality. In contrast to a RAKE receiver, a time-domain MMSE adaptive equalizer balances the need to restore Walsh channel orthogonality with noise enhancement, thereby reducing the intracellular interference on the CDMA forward link. However, as system bandwidth increases, time-domain techniques known in the art for MMSE adaptive equalization have a complexity that grows rapidly with the channel length. A larger signal bandwidth typically results in a longer channel length, as measured in chip-times. As higher and higher system bandwidths are employed in future CDMA systems, equalization strategies having complexities lower than the time-domain techniques for MMSE adaptive equalization will be needed.

Therefore, it would be desirable to have a method and device for providing improved transmission format and equalization strategies to enable CDMA systems to support much higher data rates in future broadband wireless systems. Further, it would be desirable that the improved equalization strategies provide for the complexities and problems mentioned.

BRIEF DESCRIPTION OF THE DRAWINGS

FIG. 5 is a timing diagram of one embodiment for transmitting data blocks;

FIG. 6 is a timing diagram illustrating alternative embodiments for deploying cyclic redundancies comprised of known chips (KC) in a frame containing three CDMA symbol blocks;

FIG. 7 is a timing diagram of one embodiment for inserting a block of pilot chips into the transmitted CDMA waveform;

DETAILED DESCRIPTION OF THE PRESENTLY PREFERRED EMBODIMENTS

The following detailed description presents a general formulation for the characteristics of a preferred embodiment of the invention. Based on the detailed description of the invention, a new method can be used to design new direct-sequence spread spectrum and CDMA air interfaces.

Figure 1:
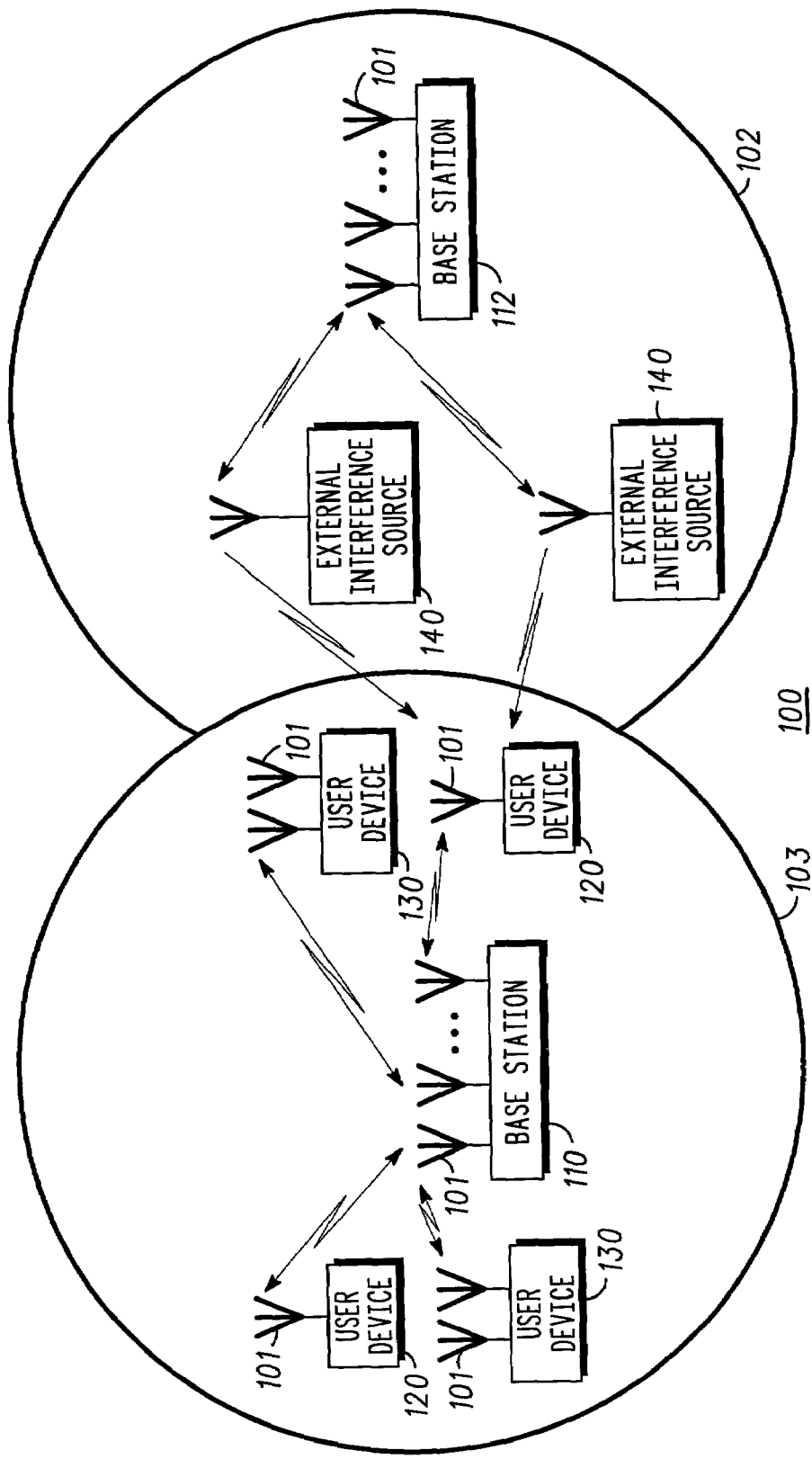
FIG. 1 is an overview diagram of one embodiment of a wireless (cellular) communication system in accordance with the invention.

FIG. 1 illustrates a wireless communication system 100 in accordance with one embodiment of the present invention.

As shown in FIG. 1, a base station 110 provides communication service to a geographic region known as a cell 103, 102. At least one user device 120 and 130 communicates with the base station 110. More generally, the term communication device can be used to refer to a user device 120, a base station 110, other types of communication transmitters or receivers, or portions or combinations of such items. In one embodiment of the wireless communication system 100, at least zero external interference sources 140 share the same spectrum allocated to the base station 110 and user devices 120 and 130. The external interference sources 140 represent an unwanted source of emissions that interferes with the communication process between the base station 110 and the user devices 120 and 130. The exact nature and number of the external interference sources 140 will depend on the specific embodiment of the wireless communication system 100. In the embodiment shown in FIG. 1, an external interference source can be another user device 140 (similar in construction and purpose to user device 120) and/or basestation 112 that is communicating with another base station 112 or user device 140, respectively, in the same frequency spectrum allocated to base station 110 and user devices 120 and 130. As shown in FIG. 1, user devices 120 have a single transmit antenna 101, while user devices 130 have at least one antenna 101. One embodiment of the invention provides that the user devices 120 and 130, as well as the base station 110 may transmit, receive, or both from the at least one antenna 101. An example of this would be a typical cellular telephone. Additionally, one embodiment of the invention can be implemented as part of a base station 110 as well as part of a user device 120 or 130. Furthermore, one embodiment provides that user devices as well as base stations may be referred to as transmitting units, receiving units, transmitters, receivers, transceivers, or any like term known in the art, and alternative transmitters and receivers known in the art may be used.

Figure 2:
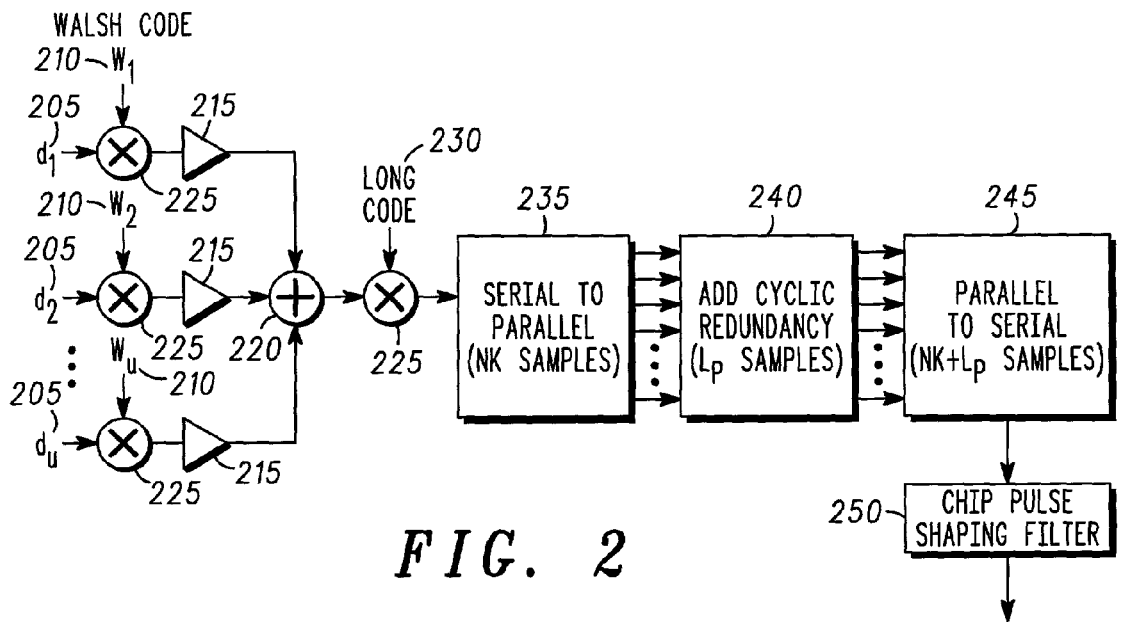
FIG. 2 is a block diagram illustrating one embodiment of a transmitting device embedded within the communication system of FIG. 1 in accordance with the invention.

FIG. 2 illustrates one embodiment for a process of generating a transmitted waveform in accordance with an embodiment of the invention. The forward link may use U Walsh codes 210 of length N to form U≦N Walsh code channels between the base station and its user population. On an active Walsh code channel, a data symbol (e.g., QAM or PSK) 205 is modulated 225 by the particular Walsh code 210, and the set of active Walsh code channels may be power controlled 215, summed 220, and spread 225 by a long code 230. When two or more code channels are active, the sum of the active code channels (before or after long code spreading) is also called a multicode sequence or a multicode spread sequence. In one embodiment, after long code spreading, the samples out of the spreader (spread sequence) 225 are converted from serial to parallel 235 creating a baseband chip-level sequence. The baseband chip-level sequence can alternatively be formed by collecting NK consecutive samples out of the spreader into a single block. In an additional embodiment, the converted spread sequence 235 may be comprised of a spread sequence portion where the spread sequence portion may contain at least; a fraction or more of the spread sequence, a plurality of concatenated spread sequences, or a baseband chip-level sequence. Further, in one embodiment, a prefix of provided $L_p$ samples are added (inserted) to the parallel outputs 235, and the resulting output 240 are converted from parallel to serial 245. The serial samples at the output 245 may then be pulse shaped 250 before being transmitted. In one embodiment, the long code 230 can be a psuedo-random code that may have the same chip spacing as the Walsh codes 210, such that the long code acts simply as a scrambling code. Additionally in one embodiment, a block containing K successive Walsh-code intervals (also called data symbol intervals) can be transmitted in a time slot on each of the U active Walsh channels. In an additional embodiment, channelization codes other than Walsh codes can be used in place of the Walsh codes 210.

The process for generating the transmitted waveform in accordance with an embodiment of the invention is illustrated mathematically in the following formula for the baseband chip-level sequence to be transmitted in the $b^{th}$ data block by the base station on the forward link:

$$s[i,b] = \sum_{u=1}^{U} A_u \sum_{k=0}^{K-1} d_u[k,b]c[i,b]W_u[i-Nk],\ 0 \le i \le NK-1 \quad (1)$$

In this embodiment of the formula (denoted as equation 1, equation (1), or (1)), $s[i,b]$ is the baseband chip-level sequence to be transmitted by the base station during the $b^{th}$ data block. $d_u[k,b]$ is the $k^{th}$ data symbol (e.g., QAM or PSK) on Walsh code channel u for the $b^{th}$ data block. In addition, the value of the long code sequence on chip i of data block b for the base station in question is $c[i,b]$. $W_u[i]$, $0 \le i \le N-1$, is the length N Walsh sequence for the $u^{th}$ Walsh channel (1≦u ≦N), where it is understood that $W_u[i]$ is nonzero only when $0 \le i \le N-1$. Additionally for this embodiment, U denotes the number of active Walsh channels, where 0≦U≦N. When two or more Walsh channels are active, $s[i,b]$ can be called a multicode chip-level sequence or a multicode signal. The factor $A_u$ denotes the power control gain factor for the $u^{th}$ Walsh code channel. The total number of chips in the $b^{th}$ block of the baseband chip-level sequence $s[i,b]$ is equal to NK. The chip level sequence may be described as a baseband sequence at a center frequency of zero for convenience, and in another embodiment the invention can be used when part or all of the processing is carried out at a non-zero center frequency.

In one embodiment of the invention, "cyclic redundancy" of $L_p$ chips may be inserted into the baseband chip-level sequence $s[i,b]$ before the sequence is filtered by a pulse shaping filter at the transmitter, as in block 240 of FIG. 2. For one embodiment of the invention, cyclic redundancy can be one of the following:

1. A cyclic prefix, which is a repetition of the last $L_p$ chips of a baseband chip-level sequence, inserted at the beginning of the chip-level sequence;

2. A cyclic postfix, which is a repetition of the first $L_p$ chips of a baseband chip-level sequence, inserted at the end of the chip-level sequence;

3. A combination of a postfix of length $L_{p1}$ and a prefix of length $L_{p2}$. In one embodiment of this method, $L_{p1}$ and $L_{p2}$ can be chosen to satisfy $(L_{p1}+L_{p2})=L_p$.

4. A null cyclic postfix, null cyclic prefix, or a combination of a null cyclic prefix and postfix. A null cyclic prefix is a prefix consisting of chips that are all zero in amplitude. If the cyclic redundancy is composed of zero chips, then the long code can be applied to the entire baseband chip-level sequence, including the cyclic redundancy.

5. $L_p$ known chips repeated before and after the baseband chip-level sequence. For another embodiment of the invention, the known chips can be pilot or other predetermined chips recognized by the receiver; or 6. A block of known chips, which is inserted either before or after each of a plurality of baseband chip-level sequences.

For one embodiment, the block of known chips can be inserted before the first baseband chip-level sequence s[i,1], and before the second baseband chip-level sequence s[i,2], and so forth. This method inserts the same block of known chips at a plurality of locations in the transmitted signal. The long code has no effect on the values of the known chips that are transmitted since the long code is not applied to these known chips.

For items 5 and 6 above, known chips can also be described as known symbols if the known chips are considered to be known symbols transmitted within the cyclic redundancy. The known chips or symbols can have arbitrary values, or they can be taken from a commonly known constellation such as M-PSK or M-QAM.

The term "cyclic redundancy", as used herein is not related to a cyclic redundancy check (CRC). CRC is a well-known method in the art for enabling a receiver to detect the presence of bit errors in a decoded bit stream. As such, a CRC, if used in a CDMA or spread spectrum system, operates on information bits in the transmitter (prior to symbol mapping and spreading) and detected bits in the receiver (after despreading and symbol detection), using error detection algorithms based on binary arithmetic. The cyclic redundancy of the present invention can be used regardless of the presence or absence of any CRC schemes in the system.

In the following description, whenever the invention is described for the case where the cyclic redundancy is a cyclic prefix, the description can easily be extended to the case where other forms of cyclic redundancy are employed.

The value of $L_p$ is not required to be an integer multiple of N because the $L_p$ samples can be discarded in the receiver of one embodiment. Additionally, the value of $L_p$ is preferably selected to be greater than or equal to the length of the multipath channel as measured in chip times, where the channel length can comprise the delay spread plus any significant "tails" of the pulse shaping waveform.

In one embodiment of the invention, a cyclic redundancy comprising a cyclic postfix can be added (inserted) at the end of the $b^{th}$ symbol block to be transmitted. The expression for the transmitted baseband chip sequence for this embodiment can be represented as:

$$x[i, b] = \begin{cases} s[i, b], & 0 \le i \le NK - 1 \\ s[i - NK, b], & NK \le i \le NK + L_p - 1 \end{cases} \quad (2)$$

In another embodiment, a cyclic redundancy comprising a cyclic prefix can be added (inserted) at the beginning of the symbol block to be transmitted. The expression for the transmitted baseband chip sequence for this embodiment can be represented as:

$$x[i, b] = \begin{cases} s[i + NK - L_p, b], & 0 \le i \le L_p - 1 \\ s[i - L_p, b], & L_p \le i \le NK + L_p - 1 \end{cases} \quad (3)$$

Additionally, in an embodiment of the invention, the cyclic redundancy is split between a cyclic prefix and a cyclic postfix.

After the sequences x[i,b], ($0 \le i \le NK+L_p-1$, $0 \le b \le B-1$) for each of the B data blocks are formed using equation (3), the sequences may be concatenated to form the transmitted baseband sequence vector x according to another embodiment of the invention:

$$x = [x[0,0] \; x[1,0] \ldots x[NK+L_p-1, B-1]]^T \quad (4)$$

The transmitted baseband sequence may then be pulse shaped to form the transmitted waveform:

$$x(t) = \sum_{i=0}^{N_c-1} x_i p_{sr}(t - iT_c) \quad (5)$$

where $x_i$ is the $i^{th}$ element of the vector x, and $p_{sr}(t)$ is the pulse shaping waveform which typically has the square-root raised cosine spectrum, as is known in the art. Also, $N_c=B(NK+L_p)$ is defined in one embodiment, to be the total number of chips to be transmitted in the B symbol blocks. Equation (5) is the "chip-level waveform" for one embodiment of a forward link transmission format of the invention. Although equation (4) represents a group of B data blocks as a single vector, this is done for mathematical convenience, and for an embodiment of the invention, it is not necessary to generate or store all B data blocks before beginning to pulse shape and transmit the first data block.

Equation (5) is the convolution of a discrete-time complex chip sequence $x_i$ and a pulse-shaping waveform $p_{sr}(t)$. The form of equation (5) may be similar to a single-carrier waveform having complex data symbols $x_i$. In a single carrier system, however, $x_i$ would be limited to a finite number of complex values corresponding to the constellation points of a well-known modulation format (e.g., BPSK, QPSK, 16-QAM, etc.). In the CDMA system, $x_i$ is not chosen from a predefined set of complex constellation points; rather, $x_i$ may be formed from the superposition of a number of Walsh-code modulated data symbols with prefixes inserted according to equations (2) and (3), for example.

The transmitted signal propagates through a multipath channel of one embodiment, with an RF impulse response given by:

$$h_{RF}(t) = \sum_{l=0}^{L-1} h_l \delta(t - \tau_l) \quad (6)$$

where $h_l$ and $\tau_l$ are the complex gain and time delay of the $l^{th}$ path, respectively and $\delta(t)$ is the Dirac delta function as known in the art. For this embodiment, the channel impulse response is assumed time-invariant during the transmitted block of K data symbols; alternatively, the extension of Equation (6) to time-varying channels is straightforward to anyone skilled in the art. At the receiver of one embodiment, the received signal is fed into a filter preferably having an impulse response $p_{sr}(-t)$. The resulting matched-filtered waveform may be illustrated mathematically as:

$$y(t) = \sum_{i=0}^{N_c-1} x_i h(t - iT_c) \quad (7)$$

where h(t) is the overall impulse response between the transmitted baseband complex sequence $x_i$ and the received matched-filtered waveform y(t). h(t) generally includes the transmit pulse shaping, the received matched filtering, and the impulse response of the RF channel, and may be illustrated as:

$$h(t) = \sum_{l=0}^{L-1} h_l p_{rc}(t - \tau_l) \quad (8)$$

where $p_{rc}(t)$ is the convolution of $p_{sr}(t)$ with $p_{sr}(-t)$, ($p_{rc}(t)$ typically has the raised-cosine spectrum). After matched-filtering, the received waveform can be sampled at the chip rate to form the received sequence y[m]:

$$y[m] = y(mT_c) = \sum_{i=0}^{N_c-1} x_i h(mT_c - iT_c) = \sum_{i=0}^{N_c-1} x_i h[m-i] \quad (9)$$

where the definition $h[m]=h(mT_c)$ is used. For clarity of presentation, Equation (9), as written, does not include the noise in the received signal. Extending the analysis to over-sampled receivers and including the effect of noise are straightforward to anyone skilled in the art. The received signal can also be sampled at a rate exceeding the chip rate and satisfying the Nyquist rate, and in one embodiment, the matched filter can be implemented digitally. When the matched filter is implemented digitally, the output can be decimated to the chip rate. If the sampling rate after the matched filter is the chip rate, the performance of the receiver may be improved for some channels by selecting a particular sampling phase, which may be determined using a chip timing estimation method.

If the RF channel impulse response contains path delays $\tau_l$ that are multiples of the chip times $T_c$, then $h(mT_c-iT_c)=h[m-i]=h_{m-i}$, provided the pulse waveform $p_{sr}(t)$ follows the zero intersymbol interference property as described in the J. G. Proakis publication "Digital Communications". With a chip-spaced channel of length L chips, Equation (9) then becomes:

$$y[m] = \sum_{i=0}^{N_c-1} x_i h_{m-i} = \sum_{l=0}^{L-1} h_l x_{m-l} \text{ for } 0 \leq m \leq N_c + L - 2 \quad (10)$$

An equation similar to (10) can also be used for arbitrary sampling points in the receiver. For this embodiment, $h_{m-i}$ can be replaced with $h((m-i-\gamma)T_c)$ from (8), which depends the impulse response of the channel, the pulse waveform, and a received signal relative sampling phase a, where $0 \leq \gamma < T_c$.

At the receiver of one embodiment, the cyclic redundancy samples (which are the first $L_p$ received samples for the case of a cyclic prefix) for each symbol block are discarded, and the remaining NK chips of each block may be transformed into the frequency domain with a length NK Fast Fourier Transform (FFT) or Discrete Fourier Transform (DFT). An embodiment provides that r[m, b] denote the received chip-spaced samples corresponding to the $b^{th}$ symbol block after the prefix samples for the block have been discarded. Starting with Equation (9) and removing the cyclic redundancy, r[m,b] can be written as:

$$r[m, b] = \sum_{i=0}^{L_p-1} h[i] s[m-i, b] \quad (11)$$

where in one embodiment of the invention, the following assumptions are made: First the raised cosine waveform $P_{rc}(t)$ may be assumed to be time limited for the interval $-N_p T_c \leq t \leq N_p T_c$, where $N_p$ is the number of significant "tails" of the raised cosine waveform. Second, in the RF channel response as defined in equation (6), the first multipath arrival time is $N_p T_c$ and the maximum multipath arrival time $\tau_L$ can be assumed no greater than $(L_p - 2N_p)T_c$, where $L_p$ is the length of the prefix. One embodiment of the invention is also applicable to cases where $\tau_L > (L_p - 2N_p)T_c$, but performance may be better when $\tau_L \leq (L_p - 2N_p)T_c$. These assumptions imply that $h[i]=h(iT_c)$ is nonzero only for $0 \leq i \leq L_p - 1$. For the $b^{th}$ symbol block, the length NK DFT of the sequence r[m,b] is defined to be:

$$R[k, b] = \sum_{m=0}^{NK-1} r[m, b] e^{-j2\pi mk/NK} \quad (12)$$

Using equation (11), and assuming an embodiment where cyclic prefixes are placed at the beginning of a symbol block, then one embodiment of equation (12) can be shown to be:

$$R[k,b]=H[k]S[k,b] \quad (13)$$

where $$S[k, b] = \sum_{m=0}^{NK-1} s[m, b] e^{-j2\pi mk/NK} \quad (14)$$

and $$H[k] = \sum_{m=0}^{L_p-1} h[m] e^{-j2\pi mk/NK} \quad (15)$$

Equations (12) through (15) can easily be extended by those skilled in the art to the cases where other forms of cyclic redundancy are used.

A frequency domain equalizer/diversity combiner operates on the frequency domain sequences $R_i[k,b]$, where the subscript i indicates the $i^{th}$ receive antenna, and i=1,2, ... M. This embodiment assumes the receiver has an arbitrary number (M) of receive antennas. The purpose of the combiner is to form a frequency domain signal Z[k,b] by weighting and summing the $R_i[k,b]$. If the vector R[k,b] is defined to be $[R_1[k,b] \; R_2[k,b] \; \ldots \; R_M[k,b]]^T$ then Z[k,b] is formed as follows:

$$Z[k,b]=w^H[k,b]R[k,b] \quad (16)$$

where w[k,b] is a length M vector of combining weights (also known as equalizer gain values) for the $k^{th}$ sub-carrier of the $b^{th}$ data block. The superscript $^H$ is the complex conjugate transpose operator. This frequency domain signal can be transformed back into the time domain using an Inverse Fast Fourier Transform (IFFT) or Inverse Discrete Fourier Transform (IDFT), where the long-code is stripped off and Walsh despreading is carried out to recover the transmitted data symbols for each Walsh-code channel. This embodiment is illustrated for a single antenna receiver in the block diagram shown in FIG. 3, and is illustrated for multiple receivers or receive antenna (branches) in FIG. 4.

Figure 3:
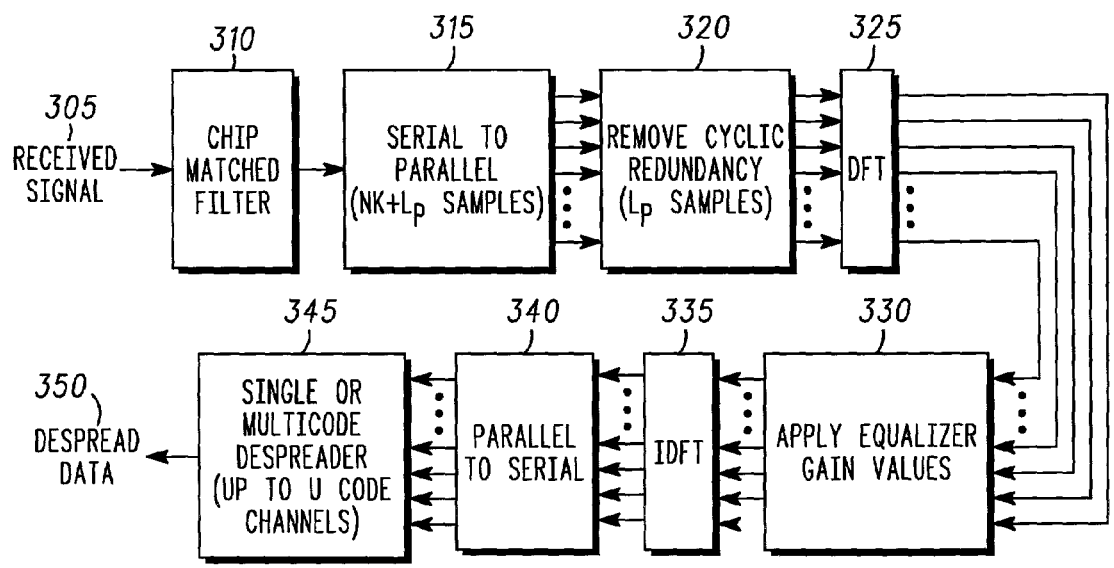
FIG. 3 is a block diagram of one embodiment of a receiving device embedded within the communication system of FIG. 1 in accordance with the invention.

For one embodiment of the invention, and as shown in FIG. 3, the received signal 305 may be filtered with a chip matched filter 310, and $NK+L_p$ samples may then be converted from serial to parallel 315. The cyclic redundancy of $L_p$ samples can be removed 320, and the result fed into a DFT 325. The equalizer gain values are applied 330 to the outputs of the DFT 325, and the result converted into the time domain with an IDFT 335. The parallel outputs of the IDFT 335 may then be converted to serial form 340. The serial outputs 340 can be fed to a despreader 345, which can compute the despread data 350.

Figure 4:
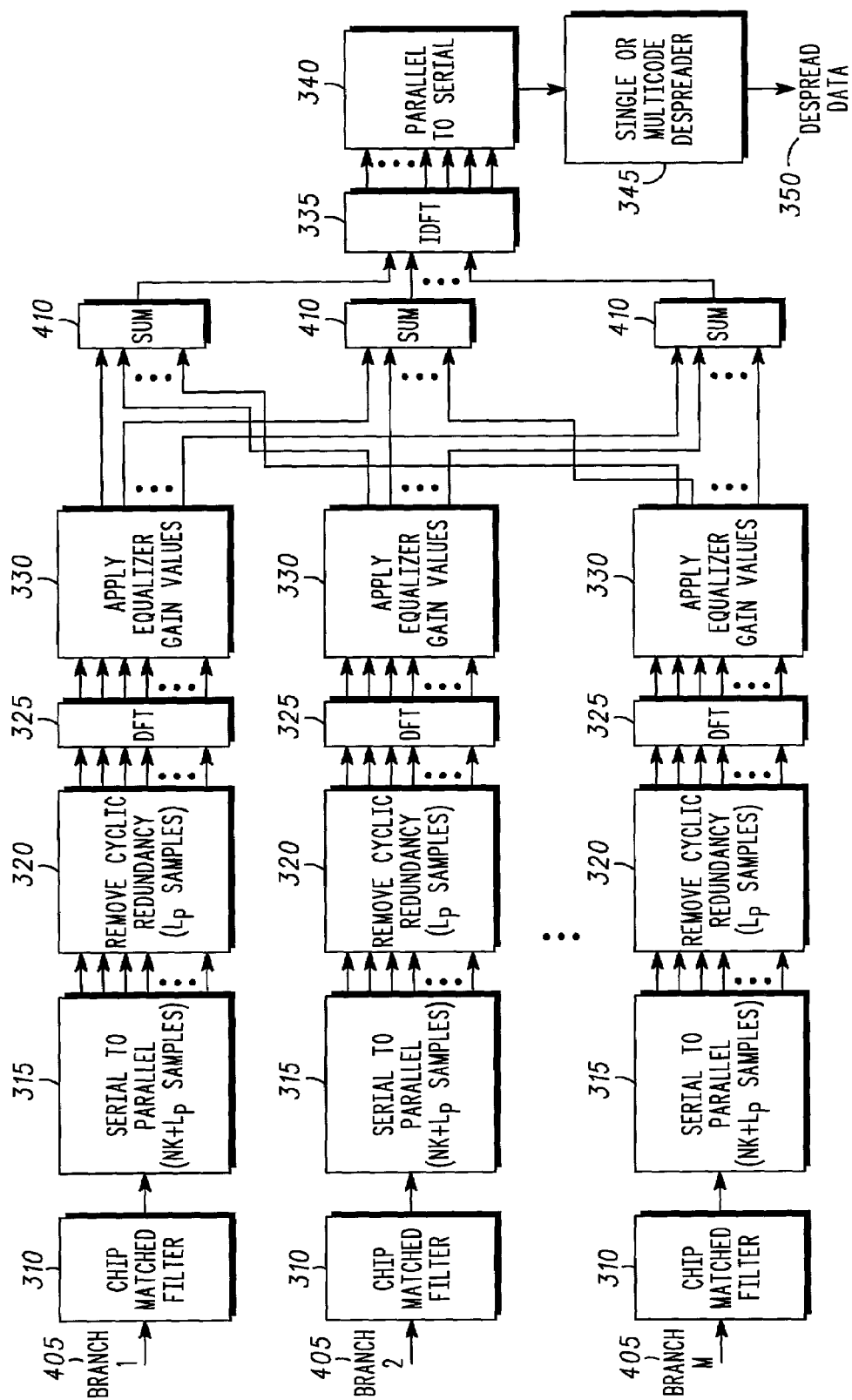
FIG. 4 is a block diagram of one embodiment of a receiving device that has a plurality of receiver branches, embedded within the communication system of FIG. 1 in accordance with the invention.

An embodiment illustrated in FIG. 4 filters the received signals from the M receiver branches 405 with a chip-matched filter 310. The outputs of the chip matched filters 310 are each converted from serial to parallel 315. The cyclic redundancy is removed 320 and the resulting samples are converted to the frequency domain with a DFT 325. After the DFT 325 in each branch, the equalizer gain values may be applied 330. The weighted outputs of the applied equalizer gain values 330 are summed by at least one summation device 410, and for one embodiment, the outputs of the at least one summation device are fed into an IDFT 335. The outputs of the IDFT 335 may then be converted from parallel to serial 340, and fed to a despreader 345 which can compute the despread data 350.

For one embodiment of the invention, there may be several criteria for computing the frequency domain weight vector for use in Equation (16). One criterion may compute the weight vector to minimize the mean square error between the frequency domain transmitted signal and the frequency domain received signal. If the noise and interference are assumed to be spatially white, then the M×1 weight vector w[k,b] that satisfies this Minimum Mean Square Error (MMSE) criteria can be shown to be:

$$w[k, b] = \frac{H[k, b]}{H^H[k, b]H[k, b] + \sigma^2(k)} \quad (17)$$

where the M×1 vector H[k,b] is defined to be $[H_1[k,b] H_2[k,b] \ldots H_M[k,b]]^T$, where $H_i[k,b]$ is the frequency domain channel gain (see equation (15)) at the $i^{th}$ receive antenna, the $k^{th}$ frequency bin and the $b^{th}$ time block. In the embodiment of equation (17), $\sigma^2(k)$ can be referred to as the noise power on the $k^{th}$ frequency bin. In another embodiment, $\sigma^2(k)$ can be the combined power of the spatially white noise plus the other-cell interference on the $k^{th}$ frequency bin. Additionally, an alternate embodiment provides that $\sigma^2(k)$ can be the power of the thermal noise on the $k^{th}$ frequency bin. Equation (17) handles both the single receive antenna equalization case as well as the joint equalization/diversity combining case with multiple receive antennas. If an embodiment of the receiver knows the channel response to J−1 interferers, then equation (17) can be modified as:

$$w[k, b] = \left(\sum_{j=1}^{J} H_j[k, b]H_j^H[k, b] + \sigma^2 I\right)^{-1} H_1[k, b] \quad (18)$$

where $H_j[k,b]$ is the M×1 vector of channel gains between the $j^{th}$ incident signal and the M receive antennas at frequency bin k, data block b. In the embodiment of equation (18), j=1 refers to the desired signal, and $\sigma^2$ represents the noise power of the receive elements after despreading. If the spatial covariance matrix of any interference aside from the aforementioned J−1 interferers is known, then the value of that known spatial covariance matrix on frequency bin k should be added to the quantity inside the parenthesis of equation (18).

Another embodiment of the invention may compute the weight vector by using the zero-forcing criteria. In this case, the M×1 weight vector w[k,b] can be shown to be:

$$w[k,b] = \{\Theta[k,b](\Theta^H[k,b]\Theta[k,b])^{-1}\}_1 \quad (19)$$

where $\{ \}_i$ denotes the $i^{th}$ column of the matrix inside the brackets, and $\Theta[k,b]$ is an M×J matrix defined as:

$$\Theta[k,b] = [H_1[k,b] H_2[k,b] \ldots H_J[k,b]] \quad (20)$$

The embodiments of equations (18) and (19) can provide the receiver the ability to explicitly suppress the interference from the J−1 interference sources in the spatial domain. This spatial interference suppression can be achieved in addition to any suppression due to CDMA despreading. The embodiment of equation (17) provides relatively little spatial suppression compared with (18) and (19) due to the spatially white interference assumption in (17). in addition, zero-forcing weights can place an explicit spatial null in the spatial directions of the J−1 interference signals, without regards to the potential for noise enhancement. The MMSE weights of equation (18) attempt to balance the problem of noise enhancement with interference suppression. Additionally, equation (18) requires an inverse of size M for each frequency bin of each data block, whereas equation (19) requires an inverse of size J. Furthermore, one embodiment provides that the channel responses used in the previously described equations are generally estimated during a training interval containing a known pilot chip sequence. If the transmitted signal power during the training interval differs from the transmitted power when the data symbols are transmitted, then the channel response used in the equalizer/diversity weights can be modified to account for the actual transmit power being used at the time the weights are applied, producing appropriately scaled frequency domain equalization weights. If the transmit power during the data portion is equal to a power weight α times the power transmitted during the training interval, then equation (17) may be modified to be:

$$w[k, b] = \frac{\sqrt{\alpha} H[k, b]}{\alpha H^H[k, b]H[k, b] + \sigma^2(k)} \quad (21)$$

An appropriate alternative embodiment is:

$$w[k, b] = \frac{H[k, b]}{H^H[k, b]H[k, b] + \frac{\sigma^2(k)}{\alpha}} \quad (22)$$

then consist of NK chips 530 plus a cyclic prefix 520 of $L_p$ chips. In this embodiment, the $L_p$ chips are a repetition of the last $L_p$ chips in the chip-level CDMA waveform.

Given the nature of the equalization strategy described for FIG. 5, there is no need to require that an integer number of CDMA Walsh-code intervals be contained in one data block.

As long as both transmitter and receiver embodiments agree in advance as to the parameters of the data block, then arbitrary block-lengths can be employed. A convenient number of CDMA chips can be chosen to belong to a data block, as long as the appropriate length $L_p$ prefix is inserted at the proper time point. The receiver can then divide the received chip-level sequence into the appropriate data blocks, perform the FFT to transition into the frequency domain, carry out the frequency domain equalization/diversity combining, and IFFT the result back into the time-domain. The time-domain equalized chip sequences from successive data blocks may then be "pieced" together and fed to the long-code removal Walsh despreading functions. Because equalization is carried out before long-code removal and Walsh despreading, how the transmitted chip sequence is blocked off and combined with cyclic redundancy can be chosen to be independent of the Walsh-code length or other system parameters. However, in a mobile environment, the length of a data block may affect performance in highly variable channels because the equalization process performs better if the channel does not change across a data block.

When an embodiment employs known chips (KC) as the cyclic redundancy rather than a cyclic prefix, the expressions for the transmitted baseband chip sequence need to be modified. Examples of known chips include, for example, zero valued chips, which are also known as null cyclic prefixes.

In order to create the appearance of a circular channel, each symbol block to be transmitted may have the same set of known chips at both the beginning and at the end of the symbol block. At the receiver, the FFT can then be carried out over the baseband chip-level sequence plus the $L_p$ known chips at the end of the symbol block. This situation is shown in the embodiment A of FIG. 6, where each block consists of $2L_p$ 645+NK 655 chips, and where K is the number of CDMA symbol intervals within a symbol block, N is the Walsh code length, and $L_p$ 645 is the prefix length. In this embodiment, the FFT size, $N_F$ 675, can be equal to NK 655+$L_p$ 645, which is different than it would be with cyclic prefixes. FIG. 6 shows two schemes for deploying known chips in a frame containing three CDMA symbol blocks. A more efficient way of deploying known chips than in embodiment A is shown in the embodiment B. In embodiment B, adjacent symbol blocks 620 share the known chips 635 and fewer chip intervals are needed to transmit the same information compared with embodiment A. As with embodiment A, embodiment B can also use an FFT size, $N_F$ 677, equal to NK 665+$L_p$ 647.

For the embodiment of A, each data block 610 has two identical sets of known chips 615, one at the beginning and one at the end. In the embodiment B, one leading set of known chips 635 at the beginning of the frame, and adjacent blocks 620 share the same set of known chips 635.

The previous embodiments may assume the receiver has determined the frequency domain channel response between the transmitter and the receiver. In the equations covering explicit spatial interference suppression (18), (19) the receiver can be assumed to have determined the frequency domain channel responses between J−1 interfering sources and the receive antenna (or antenna array when more than one receive antenna is being used).

Embodiments of the invention may use a number of viable techniques for estimating the channel responses. For many of these methods, a block of pilot chips or other known signals can be periodically inserted into the transmitted waveform. FIG. 7 shows an embodiment for inserting a block of pilot chips into a transmitted CDMA waveform. As shown in the FIG. 7, the block of pilot chips 710 is periodically inserted between data blocks 720. Any chip sequence suitable for channel estimation in accordance with the invention, can be used in the pilot block.

Similar modifications to equations (18) and (20) can be made for this embodiment.

The power weight is important for maintaining the correct relative power level between the noise power and the signal power on the data blocks. If the incorrect relative power between the data signal and the noise is used then there may be sub-optimal performance out of the MMSE combiner (e.g., increased bit error rate).

Once the frequency domain combined signal Z[k,b] is computed according to equation (16), an IFFT can be performed to compute the time-domain equivalent waveform z(t,b). To preserve the magnitude of the transmitted waveform, the following scale factor can be applied:

$$\beta = \frac{1}{\frac{1}{NK}\sum_{k=0}^{NK-1} w^H[k,b]H[k,b]} \tag{23}$$

It can be important to have the correct magnitude scaling of the estimated symbols especially for higher order modulations such as 16-QAM. An increased number of bit errors can occur because the symbol decisions may be mapped to the wrong symbol value because the amplitude scaling was incorrect. The use of the above β can prevent this problem.

Long-code removal and Walsh despreading may then be carried out. At this point, another scale factor can be applied to each Walsh Channel to match the gain of the despread symbols to the QAM constellation being used in the decision device. If the constellation is constant modulus, then scaling is not necessary.

Alternative embodiments of the invention may use alternative options for incorporating the cyclic redundancy into the CDMA forward link. FIG. 5 illustrates one embodiment of a cyclic prefix design where an integer number K of CDMA symbols can be grouped together with a cyclic prefix to form a data block. FIG. 5 contains a timing diagram 500 that illustrates an option for transmitting data blocks according to equation (1). In this embodiment, a data block 510 consists of K CDMA symbol intervals, each containing N chips. Each data block 510 may The pilot sequence can be any waveform that is suitable for measuring the channel frequency response. Examples of possible pilot chip signal formats include:

1) A multi-code CDMA signal that is similar to the multicode data signal, but uses known symbols to modulate the Walsh code channels;

2) A BPSK or QPSK signal modulated with a known symbol at each chip time;

3) An un-modulated long-code sequence; and

4) An orthogonal frequency division multiplexing (OFDM) signal modulated with known frequency domain symbols.

When frequency domain channel estimation is performed at the receiver, the received pilot sequence can be FFT'd into the frequency domain as can be done for the data blocks. Therefore, it may be helpful for the pilot chip sequence to have the same type of cyclic redundancy and the same length as a data block. If the pilot chip sequence length differs from the length of a data block, then a different size FFT may be required for the received pilot data, and the resulting frequency domain channel estimates can be either down-sampled or upsampled (interpolated) when computing the channel responses at the frequency bins used on the data blocks.

Figure 8:
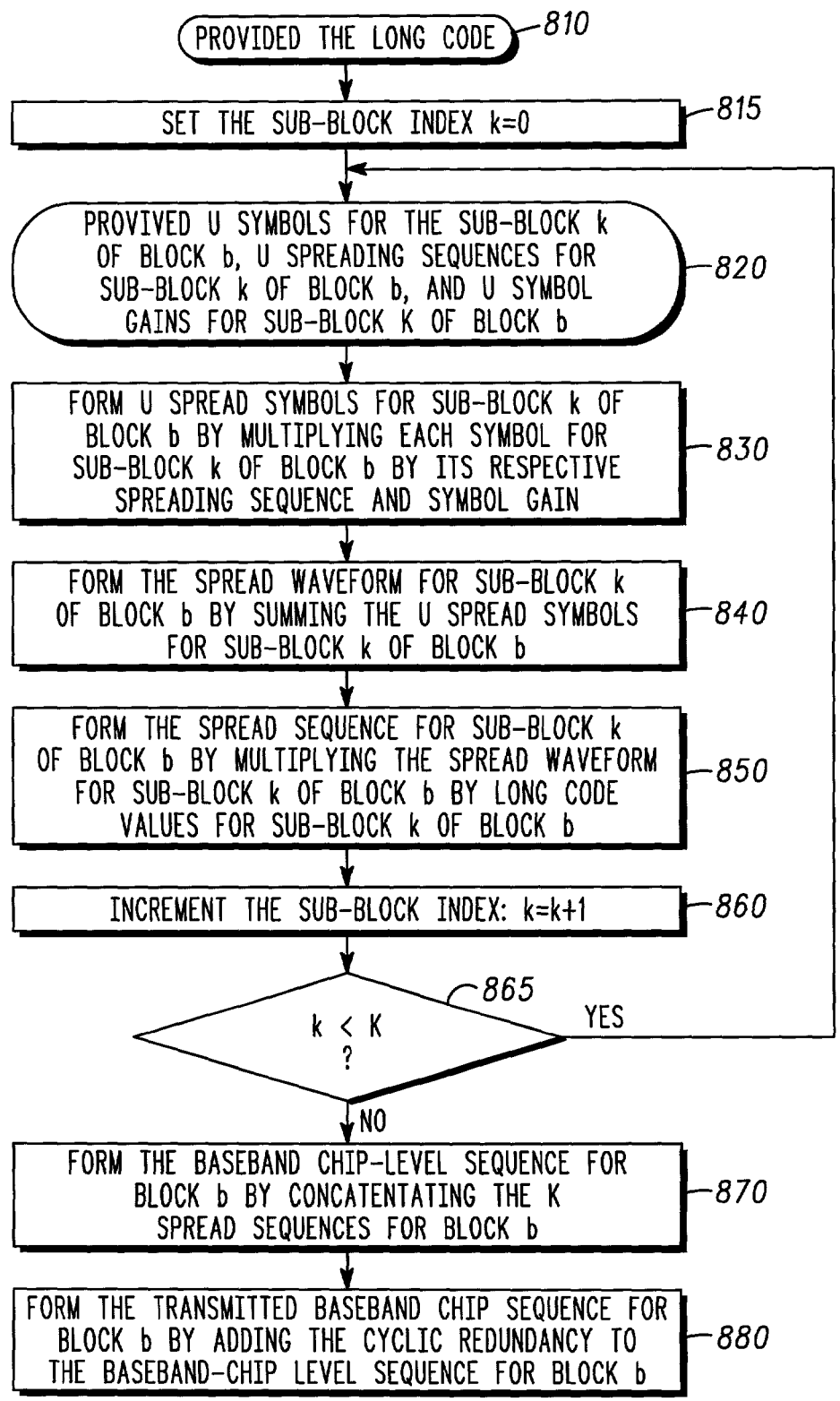
FIG. 8 is a flow diagram for one embodiment of a transmitter generating and transmitting a data sequence in accordance with the present invention.

FIG. 8 illustrates one embodiment of the invention as a flow diagram 800 of the steps the transmitter may perform to generate and transmit a data sequence on data block b. A long code or long sequence "c", which is a sequence known at the receiver and the transmitter, is provided 810 the embodiment. The long sequence is broken up into smaller sequences, c[i,b], which may be different on each data block b. The length of c[i,b] is NK where N is the length of the spreading sequences $W_u[n]$ (u=1 ... U) and K is the number of sub-blocks (each sub-block is of length N) per data block, also called the sub-block index. The sub-block index can vary between 0 and K-1, and for the embodiment, k is initially set to equal zero 815.

On sub-block k of block b there are U active spreading sequences (out of N total) which can be provided to the transmitter 820. The U symbols for sub-block k of block b are $d_1[k,b]$ through $d_U[k,b]$. The U symbol gains for sub-block k of block b are $A_1$ through $A_U$. The factor $A_u$ captures the power control gain factor for the $u^{th}$ spreading code. Further, in the flow diagram 800 U spread symbols can be formed for sub-block k of block b by multiplying each symbol for sub-block k of block b by its respective spreading sequence and symbol gain 830. For one embodiment, the U spread symbols for sub-block k of block b, $q_u[n,k,b]$ (n=0, ... N-1, u=1 ... U), are given as $$q_u[n,k,b] = d_u[k,b]W_u[n].$$

Continuing, the spread waveform for sub-block k of block b may be formed by summing the U spread symbols for sub-block k of block b 840. The spread waveform for sub-block k of block b, z[n,k,b], can be illustrated as $$z[n,k,b] = \sum_{u=1}^{U} q_u[n,k,b].$$

Next in flow diagram 800, the spread sequence for sub-block k of block b can be formed by multiplying the spread waveform for sub-block k of block b by the long code values for sub-block k of block b 850. The spread sequence for sub-block k on block b, a[n,k,b] can be illustrated as a[n,k,b]=z[n,k,b]c[kN+n,b]. Once completed, the sub-block index, k, can be incremented by one 860.

If the maximum number of sub-blocks is not reached 865, then one embodiment may continue forming the spread sequences for block b (repeat the flow diagram 800 from block 820). If the maximum number of sub-blocks is reached 865, the baseband chip-level sequence for block b may be formed by concatenating the K spread sequences for block b 870. The baseband chip-level sequence, s[i,b] (0≦i<NK-1) can be illustrated as the concatenation of the spread sequences for block b, s[i,b]={a[1,1, b], . . . , a[N,1,b], a[1,2,b], . . . , a[N,2,b], . . . , a[1,K,b], . . . , a[N,K,b]}. In an alternative embodiment, s[i,b] can be expressed as $$s[i,b] = \sum_{u=1}^{U} A_u \sum_{k=0}^{K-1} d_u[k,b]c[i,b]W_u[i-Nk], \; 0 \le i \le NK-1,$$

where it is understood that $W_u[i]$ is nonzero only when $0 \le i \le N-1$.

The transmitted baseband chip sequence for block b, x[i,b], may be formed next 880 by adding the cyclic redundancy to the baseband chip-level sequence for block b. As described earlier, the cyclic redundancy can be a prefix, a postfix, a split prefix/postfix, a null cyclic prefix, a null cyclic postfix, a block of known chips repeated before and after the baseband chip-level sequence, or a block of known chips which is inserted either before or after each of a plurality of baseband chip-level sequences. In one embodiment, a cyclic prefix of length $L_p$ is added so that the transmitted baseband sequence for block b can be equated as:

$$x[i,b] = \begin{cases} s[i+NK-L_p, b], & 0 \le i \le L_p - 1 \\ s[i-L_p, b] & L_{cp} \le i \le NK + L_p - 1 \end{cases}$$

In one embodiment, the transmitted data sequence for block b may be formed by modulating the transmitted baseband chip sequence for block b by the pulse shaping waveform. The transmitted data sequence for block b, $x_b(t)$, may be illustrated as:

$$x_b(t) = \sum_{i=0}^{NK+L_p-1} x[i,b] p_{sr}(t-iT_c)$$

where $p_{sr}(t)$ is the pulse shaping waveform (e.g., a waveform with the square-root raised cosine spectrum). The complete transmitted waveform for blocks b=1 through B, x(t), may be given as:

$$x(t) = \sum_{b=0}^{B-1} x_b(t-bT_b)$$

where $T_b$ is the time duration of a block.

Figure 9:
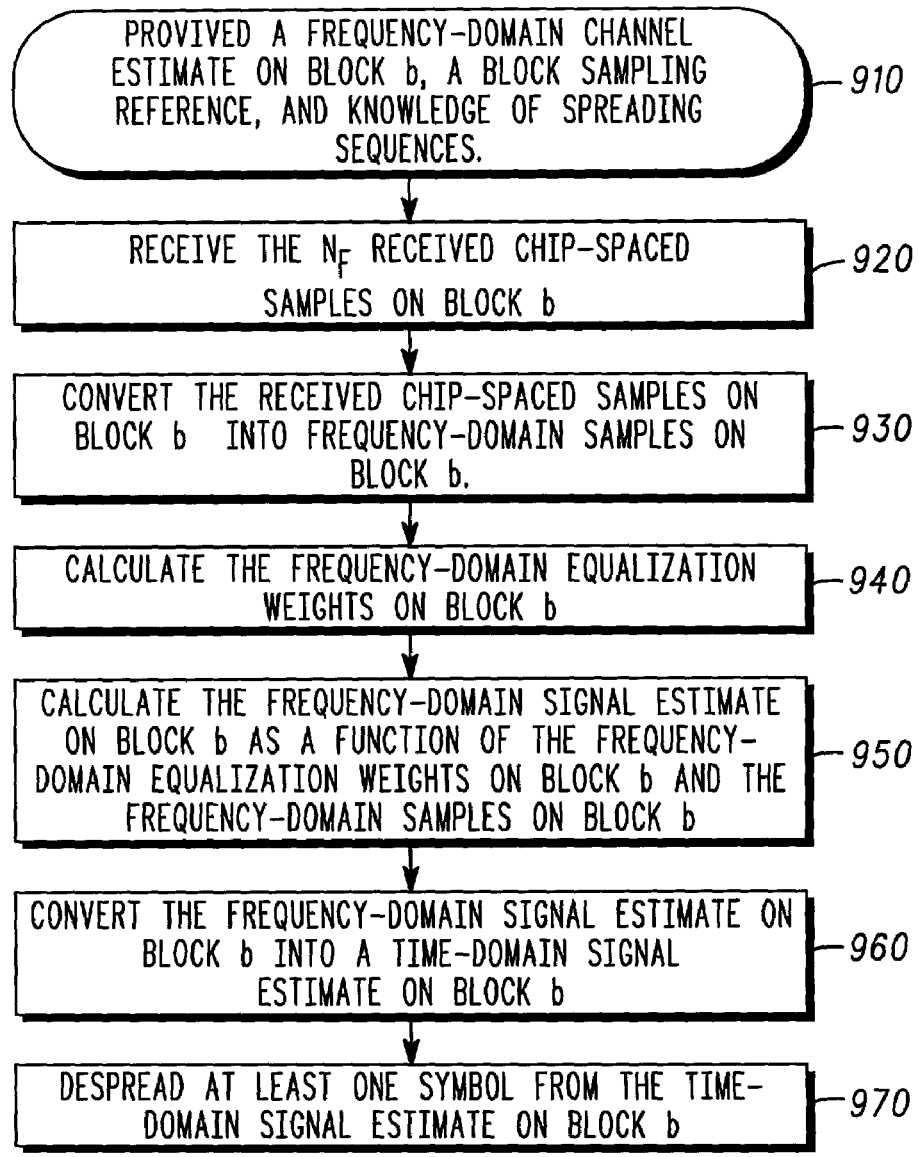
FIG. 9 is a flow diagram of one embodiment of a receiver detecting transmitted data symbols in accordance with the present invention.

FIG. 9 is a flow diagram of an embodiment of a receiver detecting the transmitted data symbols on data block b 900. The embodiment 900 begins by being provided a frequency domain channel estimate on block b, a block sampling reference, and knowledge of spreading sequences 910. The frequency domain channel estimate, H[k], on a single sub-carrier is an M×1 vector of channel gains between the transmitter and each of M receive elements at a particular subcarrier. The frequency domain channel estimate can be expressed as the DFT of the time-domain channel, h[m], where the time-domain channel is the chip-level sampling of the convolution of the pulse waveform with the true RF channel. In equation form this relationship can be expressed as:

$$H[k] = \sum_{m=0}^{N_F-1} h[m]e^{-j2\pi mk/N_F}$$

where $N_F$ is the DFT length or size (in one embodiment $N_F=NK$). $h[m]$ may include zero valued samples because the channel length is typically much less than $N_F$. The received chip-spaced samples on block b, r[m,b] ($0 \leq m \leq NK-1$), are the appropriate $N_F$ samples from block b's portion of the received signal sampled at the chip rate 920. When the cyclic redundancy is a cyclic prefix, $N_F=NK$. When the cyclic redundancy is comprised of known chips (KC) (null cyclic prefix, for example), $N_F=NK+L_p$ where $L_p$ is the length of the cyclic redundancy. Ignoring noise, r[m,b] can be modeled as:

$$r[m,b] = \sum_{n=0}^{L_p-1} h[n]s[m-n, b]$$

The frequency domain samples on block b are the DFT of the received chip-spaced samples on block b, illustrated as:

$$R[k] = \sum_{m=0}^{N_F-1} r[m]e^{-j2\pi mk/N_F}$$

This further illustrates converting the received chip-spaced samples on block b into frequency domain samples on block b 930.

In the embodiment 900 of FIG. 9, the frequency domain equalization weights on block b may be calculated 940. The frequency domain MMSE equalization weights on block b, w[k,b] ($0 \leq k \leq N_F-1$), can be expressed as:

$$w[k,b] = \frac{H[k,b]}{H^H[k,b]H[k,b] + \sigma^2(k)}$$

where $\sigma^2(k)$ is the frequency domain noise plus interference power on subcarrier k.

The process of embodiment continues by calculating the frequency domain signal estimate on block b as a function of the frequency domain equalization weights on block b and the frequency domain samples on block b 950. The frequency domain signal estimate on block b, Z[k,b], can be illustrated as:

$$Z[k,b] = w^H[k,b]R[k,b]$$

Next 960, the frequency domain signal estimate on block b may be converted into a time-domain signal estimate on block b. In equation form, the time-domain signal estimate on block b, z[k,b] can be:

$$z[m,b] = \frac{1}{N_F}\sum_{k=0}^{N_F-1} Z[k,b]e^{-j2\pi mk/N_F}$$

Finally 970, at least one symbol from the time-domain signal estimate on block b may be despread when the time-domain signal is sent to a conventional single or multicode despreader. This can recover any subset of the U transmitted signals on each of the K sub-blocks in block b.

In one embodiment, the symbol estimate for the $U^{th}$ Walsh channel can be expressed as the despreading of the signal estimate on block b as follows:

$$\hat{d}_u[k,b] = \frac{1}{A_u}\sum_{m=0}^{N-1} W_u[m]c[m+kN, b]z[m+kN, b]$$

Figure 10:
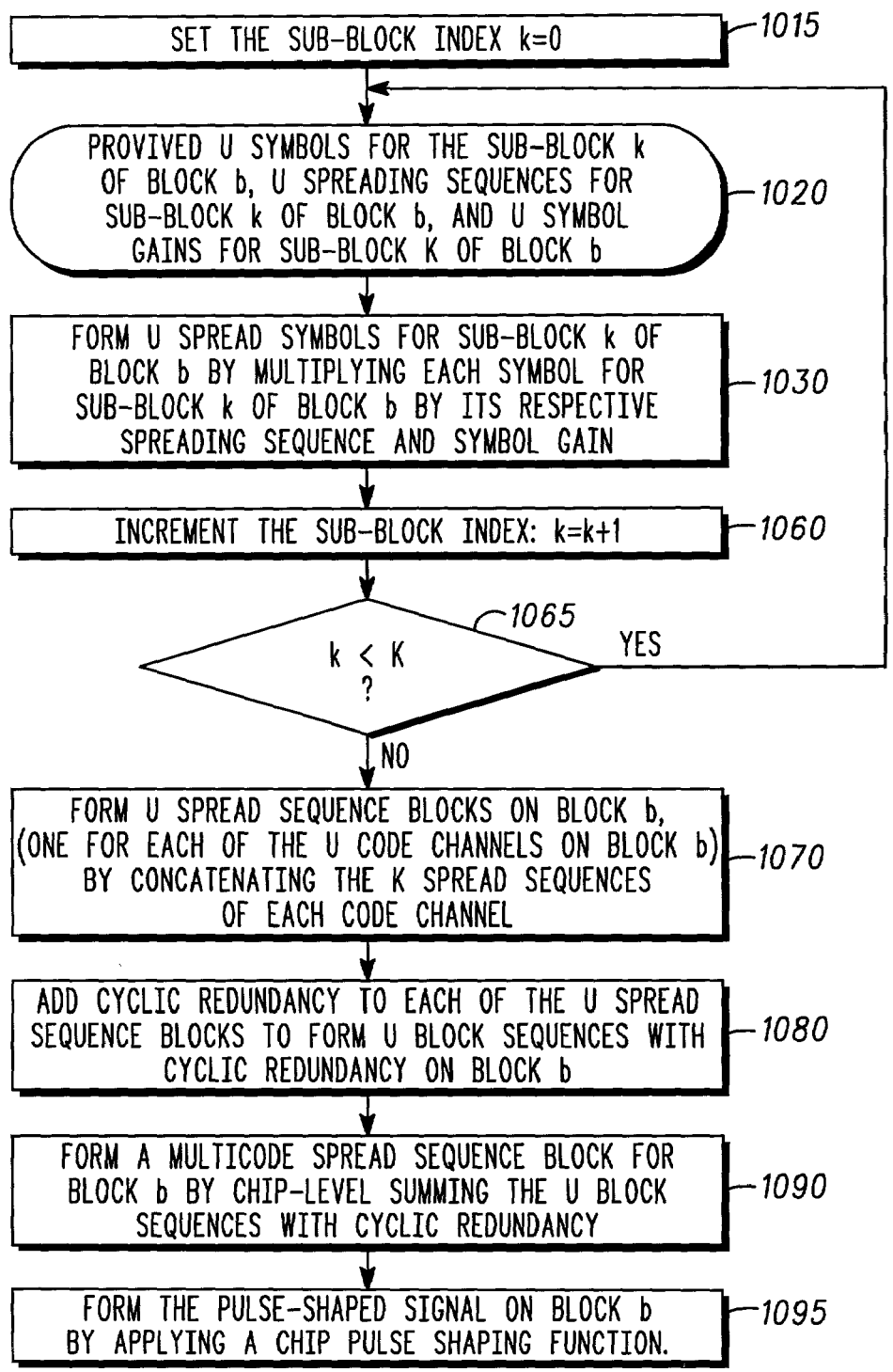
FIG. 10 is a flow diagram for an additional embodiment of a transmitter in accordance with the invention.

Illustrated in FIG. 10 is a flow diagram of one embodiment 1000 of a transmitter in accordance with the invention. The embodiment 1000 may assume that the time varying long-code can be combined with the spreading sequence. The embodiment begins by setting the sub-block index k, equal to zero 1015. On sub-block k and block b there are U active spreading sequences (out of N total) which can be provided to the transmitter 1020. The U symbols for sub-block k of block b are $d_1[k,b]$ through $d_U[k.b]$. The U symbol gains for sub-block k of block b are $A_1$ through $A_U$. The factor $A_U$ captures the power control gain factor for the $u^{th}$ spreading code. Further in the embodiment 1000, U spread sequences can be formed for sub-block k of block b by multiplying each symbol for sub-block k of block b by its respective spreading sequence and symbol gain 1030.

The embodiment 1000 may increment the sub-block index k by one 1060. If the maximum number of sub-blocks is not reached 1065, then one embodiment may form U additional spread sequences (one for each of the U code channels) for block b (repeat the embodiment 1000 from block 1020). If the maximum number of sub-blocks is reached 1065, spread sequences having the same code channel may be concatenated into a spread sequence block. This step is done for each code channel to form U spread sequence blocks 1070.

A further embodiment 1000 may add cyclic redundancy to each individual spread sequence block to form U block sequences with cyclic redundancy 1080. The U block sequences with cyclic redundancy may be chip-level summed to form a multicode spread sequence block with cyclic redundancy 1090. Another embodiment 1000 may form a pulse-shaped signal on block b by applying a chip pulse shaping function to the multicode spread sequence block with cyclic redundancy 1095. The pulse-shaped signal may then be transmitted.

One embodiment of the invention has been described for the forward link of a direct-sequence spread spectrum system, but an embodiment of the invention can also be used for the reverse link, or uplink, of a direct-sequence spread spectrum or CDMA communication system. Further, an embodiment of the invention can be used in a point-to-point or point-to-multipoint direct-sequence spread spectrum communication link.

Additionally in an embodiment of the invention, Walsh codes can be used to define a plurality of code channels in the transmitted signal; however, alternative embodiments may also be used with other types of channelization and/or spreading codes. Generally, orthogonal codes should be used to obtain the highest performance. Additional embodiments of the invention can also be used in a system that uses variable spreading factors.

In one embodiment of the invention, the cyclic redundancy is inserted before the pulse shape filtering is applied; however, alternative embodiments may insert the cyclic redundancy after pulse shape filtering. In this case, the spread sequence portion and the cyclic redundancy are pulse shape filtered separately, and are then combined prior to transmission. Since the pulse shape filtering is a linear signal processing operation, the combining may be performed such that the transmitted sequence or signal is mathematically the same as for the embodiments where the cyclic redundancy is inserted before the pulse shape filtering is applied.

In one embodiment of the invention, a frequency domain equalizer is used in the receiver, and the equalized signal is despread following the frequency domain equalizer. In an alternate embodiment, the frequency domain equalizer may be followed by additional processing to further enhance the equalized signal. For such an embodiment, a feedback filter that cancels post-cursor inter-chip interference may be used after the frequency domain equalized signal is transformed to the time domain. In this embodiment, all transmitted code channels should be despread and detected. The detected symbols, code channel gains, spreading codes from the code channels, and the long code are then used to synthesize an estimate of the multi-code chip-level sequence that was transmitted. The synthesized chip-level sequence is fed into the feedback filter. In this alternate embodiment, the values of the frequency domain equalization weights may be different than in previously described embodiments. The frequency domain equalization weights and the feedback filter weights may be jointly computed according to a minimum mean square error or zero forcing criterion, for example. This alternate embodiment may not be applicable if the receiver cannot determine one or more of the following: The number of code channels that are being transmitted (the number of active code channels), the specific channelization codes that are being used, the code channel gain of each channelization code. Furthermore, the performance of this alternate embodiment is sensitive to any errors in the detected symbols on any active code channel.

In an additional alternate embodiment, the frequency domain equalization methods of the invention can be used when the spread sequence does not include cyclic redundancy. In this embodiment, the receiver complexity is typically greater than other embodiments because additional processing steps, such as overlap-and-add or overlap-and-save filtering techniques need to be used.

The embodiments of the present invention may be implemented in hardware, software, or combinations of hardware and software. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   providing at least one spread sequence portion;
   providing a cyclic redundancy; and
   forming a transmitted sequence based on an arrangement of the spread sequence portion and the cyclic redundancy,
   wherein the spread sequence portion comprises a baseband chip-level sequence computed according to:

$$s[i, b] = \sum_{u=1}^{U} A_u \sum_{k=0}^{K-1} d_u[k, b] c[i, b] W_u[i - Nk], \quad 0 \le i \le NK - 1$$

wherein i is an integer indicating the chip number, b is an integer indicating the data block, $d_u[k,b]$ is the $k^{th}$ data symbol on channelization code channel u for the $b^{th}$ data block, $c[i,b]$ is the value of the long/scrambling code sequence on chip i of data block b, $W_u[i]$ is the length N channelization sequence for the $u^{th}$ channelization code channel, U denotes the number of active channelization code channels, K denotes the number of successive channelization-code intervals, and the factor $A_u$ denotes the power control gain factor for the $u^{th}$ channelization code channel.

2. The method of claim 1, wherein the spread sequence portion is a fraction of a spread sequence.

3. The method of claim 1, wherein the spread sequence portion is at least one spread sequence.

4. The method of claim 1, wherein the spread sequence portion comprises a plurality of concatenated spread sequences.

5. The method of claim 1, wherein the spread sequence portion comprises a multicode sequence.

6. The method of claim 1, wherein the forming comprises inserting cyclic redundancy to the spread sequence portion for at least one symbol boundary.

7. The method of claim 1, wherein the cyclic redundancy comprises zero value chips.

8. The method of claim 1, wherein the cyclic redundancy comprises a known sequence.

9. A method comprising:
   providing at least one spread sequence portion;
   providing a cyclic redundancy; and
   forming a transmitted sequence based on an arrangement of the spread sequence portion and the cyclic redundancy,
   wherein the transmitted sequence is formed according to at least one of:

$$x[i, b] = \begin{cases} s[i, b], & 0 \le i \le NK - 1 \\ s[i - NK, b], & NK \le i \le NK + L_p - 1 \end{cases}$$

$$x[i, b] = \begin{cases} s[i, +NK - L_p, b], & 0 \le i \le L_p - 1 \\ s[i - L_p, b] & L_p \le i \le NK + L_p - 1 \end{cases}$$

wherein i is an integer indicating the chip number, b is an integer indicating the data block, $s[i,b]$ is the baseband chip-level sequence, N denotes the length of the channelization codes, K denotes the number of successive channelization-code intervals, and $l_p$, indicates the length of the cyclic redundancy.

10. The method of claim 1, wherein the forming of the transmitted sequence comprises inserting the cyclic redundancy as a cyclic prefix to at least one spread sequence portion and as a cyclic postfix to at least one spread sequence portion.

11. A communication apparatus comprising:
a transmitting device to form a transmitted sequence based on an arrangement of a spread sequence and a cyclic redundancy; and
at least one antenna for transmitting the transmitted sequence,
wherein the spread sequence comprises a baseband chip-level sequence computed according to:

$$s[i,b] = \sum_{u=1}^{U} A_u \sum_{k=0}^{K-1} d_u[k,b]c[i,b]W_u[i-Nk], \ 0 \le i \le NK-1$$

wherein i is an integer indicating the chip number, b is an integer indicating the data block, $d_u[k,b]$ is the $k^{th}$ data symbol on channelization code channel u for the $b^{th}$ data block, c[i,b] is the value of the long/scrambling code sequence on chip i of data block b, $W_u[i]$ is the length N channelization sequence for the $u^{th}$ channelization code channel, U denotes the number of active channelization code channels, K denotes the number of successive channelization-code intervals, and the factor $A_u$ denotes the power control gain factor for the $u^{th}$ channelization code channel.

12. The communication apparatus of claim 11, wherein the spread sequence portion is a fraction of a spread sequence.

13. The communication apparatus of claim 11, wherein the spread sequence portion is at least one spread sequence.

14. The communication apparatus of claim 11, wherein the spread sequence portion comprises a plurality of concatenated spread sequences.

15. The communication apparatus of claim 11, wherein the spread sequence portion comprises a multicode sequence.

16. The communication apparatus of claim 11, wherein the forming of the transmitted sequence comprises inserting cyclic redundancy to the spread sequence for at least one symbol boundary.

17. The communication apparatus of claim 11, wherein the cyclic redundancy comprises zero value chips.

18. The communication apparatus of claim 11, wherein the cyclic redundancy comprises a known sequence.

19. A communication apparatus, comprising:
a transmitting device to form a transmitted sequence based on an arrangement of a spread sequence and a cyclic redundancy; and
at least one antenna for transmitting the transmitted sequence,
wherein the transmitted sequence is formed according to at least one of:

$$x[i,b] = \begin{cases} s[i,b], & 0 \le i \le NK-1 \\ s[i-NK,b], & NK \le i \le NK+L_p-1 \end{cases}$$

$$x[i,b] = \begin{cases} s[i,b], & 0 \le i \le NK-1 \\ s[i-NK,b], & NK \le i \le NK+L_p-1 \end{cases}$$

wherein i is an integer indicating the chip number, b is an integer indicating the data block, s[i,b] is the baseband chip-level sequence, N denotes the length of the channelization codes, K denotes the number of successive channelization-code intervals, and $L_p$ indicates the length of the cyclic redundancy.

20. The communication apparatus of claim 11, wherein the forming of the transmitted sequence comprises inserting the cyclic redundancy as a cyclic prefix to at least one spread sequence portion and as a cyclic postfix to at least one spread sequence portion.

21. A communication system comprising:
means for providing at least one spread sequence portion; and
means for inserting a cyclic redundancy to the spread sequence portion to form a transmitted sequence,
wherein the spread sequence comprises a baseband chip-level sequence computed according to:

$$s[i,b] = \sum_{u=1}^{U} A_u \sum_{k=0}^{K-1} d_u[k,b]c[i,b]W_u[i-Nk], \ 0 \le i \le NK-1$$

wherein i is an integer indicating the chip number, b is an integer indicating the data block, $d_u[k,b]$ is the $k^{th}$ data symbol on channelization code channel u for the $b^{th}$ data block, c[i,b] is the value of the long/scrambling code sequence on chip i of data block b, $W_u[i]$ is the length N channelization sequence for the $u^{th}$ channelization code channel, U denotes the number of active channelization code channels, K denotes the number of successive channelization-code intervals, and the factor $A_u$ denotes the power control gain factor for the $u^{th}$ channelization code channel.

22. The communication system of claim 21, further comprising means for creating a cyclic redundancy.

23. A computer readable medium storing a computer program comprising:
computer readable code for forming a sequence based on an arrangement of a cyclic redundancy and at least one spread sequence portion; and
computer readable code for transmitting the sequence,
wherein the spread sequence comprises a baseband chip-level sequence computed according to:

$$s[i,b] = \sum_{u=1}^{U} A_u \sum_{k=0}^{K-1} d_u[k,b]c[i,b]W_u[i-Nk], \ 0 \le i \le NK-1$$

wherein i is an integer indicating the chip number, b is an integer indicating the data block, $d_u[k,b]$ is the $k^{th}$ data symbol on channelization code channel u for the $b^{th}$ data block, c[i,b] is the value of the long/scrambling code sequence on chip i of data block b, $W_u[i]$ is the length N channelization sequence for the $u^{th}$ channelization code channel, U denotes the number of active channelization code channels, K denotes the number of successive channelization-code intervals, and the factor $A_u$ denotes the power control gain factor for the $u^{th}$ channelization code channel.

24. The computer readable medium of claim 23, wherein the spread sequence portion is a fraction of a spread sequence.

25. The computer readable medium of claim 23, wherein the at least one spread sequence portion comprises a baseband chip-level sequence.

26. The computer readable medium of claim 23, wherein the spread sequence portion comprises a multicode sequence.

27. The computer readable medium of claim 23, wherein the forming comprises inserting cyclic redundancy to the spread sequence portion for at least one symbol boundary.

28. The computer readable medium of claim 23, wherein the cyclic redundancy comprises a known sequence.

29. A method of operating a communication apparatus, comprising:
   converting a plurality of receive samples from at least one spread sequence portion into a plurality of frequency domain samples;
   determining an equalized signal based on the frequency domain samples;
   determining a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power; and
   determining a time domain signal estimate based on the frequency domain equalization weights and frequency domain samples.

30. The method of claim 29, wherein the receive samples include cyclic redundancy.

31. The method of claim 30, wherein the receive samples including cyclic redundancy are converted into the plurality of frequency domain samples.

32. The method of claim 29, further comprising: receiving the receive samples at a plurality of receiver branches.

33. The method of claim 29, wherein the receive samples comprise chip-spaced samples.

34. The method of claim 29, wherein the frequency domain equalization weights are determined based on a power weight, a plurality of frequency domain channel estimates, and one of at least one noise power, at least one interference power, and at least one noise plus interference power.

35. The method of claim 29, wherein the frequency domain equalization rates are determined according to:

$$w[k,b] = \left(\sum_{j=1}^{J} H_j[k,b] H_j^H[k,b] + \sigma^2 I\right)^{-1} H_1[k,b]$$

wherein J is the number of interferers plus one, $H_j[k,b]$ is the M×1 vector of channel gains between the $j^{th}$ incident signal and the M receive antennas at frequency bin k and data block b, and $\sigma^2$ represents the noise power of the receive elements after despreading.

36. The method of claim 29, wherein the frequency domain equalization rates are determined according to:

$w[k,b] = \{\Theta[k,b](\Theta^H[k,b]\Theta[k,b])^{-1}\}_i$ wherein $\{\ \}_i$ denotes the $i^{th}$ column of the matrix inside the brackets, $\Theta[k,b]=[H_1[k,b]\ H_2[k,b]\ \ldots\ H_J[k,b]]$, and $H_j[k,b]$ is the M×1 vector of channel gains between the $j^{th}$ incident signal and the M receive antennas at frequency bin k and data block.

37. The method of claim 29, wherein the frequency domain equalization weights are determined according to:

$$w[k,b] = \frac{\sqrt{\alpha}\, H[k,b]}{\alpha H^H[k,b]H[k,b] + \sigma^2(k)}.$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, $\sigma^2(k)$ is the noise power on the $k^{th}$ frequency bin, and $\alpha$ is the ratio of the transmit power during the data portion to the transmit power during the training interval.

38. The method of claim 29, wherein the frequency domain equalization weights are scaled according to:

$$\beta = \frac{1}{\frac{1}{NK}\sum_{k=0}^{NK-1} w^H[k,b]H[k,b]}$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, N denotes the length of the channelization codes, K denotes the number of successive channelization-code intervals, and w[k,b] is the frequency domain equalization weight.

39. The method of claim 29, further comprising: removing a cyclic redundancy from the receive samples prior to converting to the frequency domain samples.

40. The method of claim 29, wherein the frequency domain equalization weights are determined according to:

$$w[k,b] = \frac{H[k,b]}{H^H[k,b]H[k,b] + \frac{\sigma^2(k)}{\alpha}}$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, $\sigma^2(k)$ is the noise power on the $k^{th}$ frequency bin, and $\alpha$ is the ratio of the transmit power during the data portion to the transmit power during the training interval.

41. A communication apparatus comprising:
   means for converting a plurality of receive samples from at least one spread sequence portion into a plurality of frequency domain samples;
   means for determining an equalized signal based on the frequency domain samples;
   means for determining a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power; and
   means for determining a time domain signal estimate based on the frequency domain equalization weights and frequency domain samples.

42. A communication apparatus comprising:
   at least one antenna for receiving a plurality of receive samples;

a receiving device to convert the plurality of receive samples from at least one spread sequence portion into a plurality of frequency domain samples, to determine an equalized signal based on the frequency domain samples and to determine a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power; and wherein the receiving device determines a plurality of frequency domain equalization weights for the frequency domain samples, and determines a time domain signal estimate based on the frequency domain equalization weights and frequency domain samples.

43. The communication apparatus of claim 42, wherein the receive samples include cyclic redundancy.

44. The communication apparatus of claim 43, wherein the receive samples including cyclic redundancy are converted into the plurality of frequency domain samples.

45. The communication apparatus of claim 42, wherein the receiver device comprises a plurality of receiver branches to receive the receive samples.

46. The communication apparatus of claim 42, wherein the receive samples comprise chip-spaced samples.

47. The communication apparatus of claim 42, wherein the frequency domain equalization weights are determined based on a power weight, a plurality of frequency domain channel estimates, and one of at least one noise power, at least one interference power, and at least one noise plus interference power.

48. The communication apparatus of claim 42, wherein the frequency domain equalization rates are determined according to:

$$w[k,b] = \left(\sum_{j=1}^{J} H_j[k,b]H_j^H[k,b] + \sigma^2 I\right)^{-1} H_1[k,b]$$

wherein J is the number of interferers plus one, $H_j[k,b]$ is the M×1 vector of channel gains between the $j^{th}$ incident signal and the M receive antennas at frequency bin k and data block b, and $\sigma^2$ represents the noise power of the receive elements after despreading.

49. The communication apparatus of claim 42, wherein the frequency domain equalization rates are determined according to:

$w[k,b] = \{\Theta[k,b](\Theta^H[k,b]\Theta[k,b])^{-1}\}_1$ wherein $\{\}_i$ denotes the $i^{th}$ column of the matrix inside the brackets, $\Theta[k,b]=[H_1[k,b]\ H_2[k,b]\ \ldots\ H_J[k,b]]$, and $H_j[k,b]$ is the M×1 vector of channel gains between the $j^{th}$ incident signal and the M receive antennas at frequency bin k and data block.

50. The communication apparatus of claim 42, wherein the frequency domain equalization weights are determined according to:

$$w[k,b] = \frac{\sqrt{\alpha}\, H[k,b]}{\alpha H^H[k,b]H[k,b] + \sigma^2(k)}$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, $\sigma^2(k)$ is the noise power on the $k^{th}$ frequency bin, and $\alpha$ is the ratio of the transmit power during the data portion to the transmit power during the training interval.

51. The communication apparatus of claim 42, wherein the frequency domain equalization weights are scaled according to:

$$w[k,b] = \frac{H[k,b]}{H^H[k,b]H[k,b] + \frac{\sigma^2(k)}{\alpha}}$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, N denotes the length of the channelization codes, K denotes the number of successive channelization-code intervals, and w[k,b] is the frequency domain equalization weight.

52. The communication apparatus of claim 42, wherein the receiving device removes a cyclic redundancy from the receive samples prior to converting to the frequency domain samples.

53. The communication apparatus of claim 42, wherein the frequency domain equalization weights are determined according to:

$$w[k,b] = \frac{H[k,b]}{H^H[k,b]H[k,b] + \frac{\sigma^2(k)}{\alpha}}$$

wherein the M×1 vector H[k,b] is $[H_1[k,b]\ H_2[k,b]\ \ldots\ H_M[k,b]]^T$, $H_i[k,b]$ is the frequency domain channel gain at the $i^{th}$ receive antenna, $\sigma^2(k)$ is the noise power on the $k^{th}$ frequency bin, and $\alpha$ is the ratio of the transmit power during the data portion to the transmit power during the training interval.

54. A computer readable medium including a program comprising:

computer readable code for converting a plurality of receive samples from at least one spread sequence portion into a plurality of frequency domain samples;

computer readable code for determining an equalized signal based on the frequency domain samples;

computer readable code for determining a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power; and computer readable code for determining a time domain signal estimate based on the frequency domain equalization weights and frequency domain samples.

55. The computer readable medium of claim 54, wherein the receive samples include cyclic redundancy.

56. The computer readable medium of claim 55, wherein the receive samples including cyclic redundancy are converted into the plurality of frequency domain samples.

57. The computer readable medium of claim 54, further comprising:
  receiving the receive samples at a plurality of receiver branches.

58. The computer readable medium of claim 54, further comprising:
  removing a cyclic redundancy from the receive samples prior to converting to the frequency domain samples.

59. A method of operating a communication apparatus, comprising:
  converting a plurality of receive samples from at least one spread sequence portion into a plurality of frequency domain samples;
  determining an equalized signal based on the frequency domain samples;
  determining a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power;
  wherein the receive samples include cyclic redundancy; and
  wherein the receive samples including cyclic redundancy are converted into the plurality of frequency domain samples.

60. A communication apparatus comprising:
  at least one antenna for receiving a plurality of receive samples;
  a receiving device to convert the plurality of receive samples from at least one spread sequence portion into a plurality of frequency domain samples, to determine an equalized signal based on the frequency domain samples and to determine a plurality of frequency domain equalization weights for the frequency domain samples, wherein the frequency domain equalization weights are determined based on at least one of a power weight, a plurality of frequency domain channel estimates, at least one noise power, at least one interference power, and at least one noise plus interference power
  wherein the receive samples include cyclic redundancy; and
  wherein the receive samples including cyclic redundancy are converted into the plurality of frequency domain samples.

* * * * *